(12) United States Patent
Kippley et al.

(10) Patent No.: US 8,963,516 B2
(45) Date of Patent: Feb. 24, 2015

(54) PRECISION OUTPUT CONTROL FOR DC VOLTAGE REGULATORS

(71) Applicant: Astec International Limited, Kowloon (HK)

(72) Inventors: Robert Henry Kippley, Eagan, MN (US); Bruce Arlen Frederick, Plymouth, MN (US)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 13/784,273

(22) Filed: Mar. 4, 2013

(65) Prior Publication Data

US 2014/0247023 A1    Sep. 4, 2014

(51) Int. Cl.
*G05F 3/16*    (2006.01)
*H02M 3/02*    (2006.01)

(52) U.S. Cl.
CPC .................................... *H02M 3/02* (2013.01)
USPC .......................................... 323/225; 323/224

(58) Field of Classification Search
USPC .......................... 323/222, 223, 224, 225, 226
See application file for complete search history.

(56) References Cited

U.S. PATENT DOCUMENTS

| | | | |
|---|---|---|---|
| 4,571,532 A * | 2/1986 | Jaster | 320/101 |
| 5,534,771 A | 7/1996 | Massie | |
| 6,586,917 B1 * | 7/2003 | Smith | 323/280 |
| 7,196,499 B1 | 3/2007 | Lipcsei | |
| 7,863,870 B2 * | 1/2011 | Nathan | 323/222 |
| 7,969,121 B2 | 6/2011 | Smith et al. | |
| 7,990,119 B2 * | 8/2011 | Petty | 323/273 |
| 8,085,007 B2 * | 12/2011 | Sakimura et al. | 323/224 |
| 8,310,849 B2 | 11/2012 | Lin et al. | |
| 2006/0097709 A1 * | 5/2006 | Huang et al. | 323/274 |
| 2006/0108991 A1 * | 5/2006 | Jiang et al. | 323/274 |
| 2009/0309567 A1 * | 12/2009 | Morroni et al. | 323/283 |
| 2010/0164448 A1 * | 7/2010 | Miles | 323/282 |
| 2011/0267726 A1 * | 11/2011 | Ikeuchi et al. | 361/63 |

OTHER PUBLICATIONS

TL431 Datasheet; Texas Instruments; 2004-2011.
Maxim Application Note 2008; Accurate DC-DC Converter Minimizes Wasted Power; May 11, 2003.
Power Electronics Technology; Basso, Christophe; Biasing the TL431 for Improved Output Impedance; Jan. 2005.

* cited by examiner

*Primary Examiner* — Emily P Pham
(74) *Attorney, Agent, or Firm* — Harness, Dickey & Pierce, P.L.C.

(57) ABSTRACT

A power supply includes an input terminal, an output terminal, a DC voltage regulator coupled between the input terminal and the output terminal to provide a substantially constant DC output voltage at the output terminal, a voltage divider coupled between the output terminal and ground (e.g., earth ground or another suitable reference potential), the voltage divider including at least a first resistance, a second resistance and a first node between the first resistance and the second resistance, the first node coupled to the DC voltage regulator to provide a feedback voltage to the DC voltage regulator for regulating the DC output voltage, and an adjustable shunt regulator coupled between the output terminal and the first node.

14 Claims, 4 Drawing Sheets

PRECISION OUTPUT CONTROL FOR DC VOLTAGE REGULATORS

FIELD

The present disclosure relates to precision output control for dc voltage regulators.

BACKGROUND

This section provides background information related to the present disclosure which is not necessarily prior art.

DC voltage regulators are employed in a wide variety of applications for supplying constant DC voltages to various loads. As shown in FIG. 1, a DC voltage regulator may have a voltage divider (resistors $R_A$ and $R_B$) coupled between its output terminals for providing a feedback voltage to a feedback (FB) input. The DC voltage regulator uses the feedback voltage to regulate its DC output voltage Vout. For example, the design of a particular DC voltage regulator may assume a feedback voltage having a nominal value of 0.8V when the DC output voltage is 5V. However, the actual value of the feedback voltage may be greater or less than 0.8V when the DC output voltage is 5V due to component tolerances, line and load regulation variances, etc. For this reason, the nominal feedback voltage of 0.8V may have an associated tolerance, such as ±2.5%. In that event, the rated output voltage, which is regulated using the feedback voltage, will have a tolerance of at least ±2.5%, and typically greater than ±2.5%.

SUMMARY

This section provides a general summary of the disclosure, and is not a comprehensive disclosure of its full scope or all of its features.

According to one aspect of the present disclosure, a power supply includes an input terminal, an output terminal, a DC voltage regulator coupled between the input terminal and the output terminal to provide a substantially constant DC output voltage at the output terminal, a voltage divider coupled between the output terminal and ground (e.g., earth ground or another suitable reference potential), the voltage divider including at least a first resistance, a second resistance and a first node between the first resistance and the second resistance, the first node coupled to the DC voltage regulator to provide a feedback voltage to the DC voltage regulator for regulating the DC output voltage, and an adjustable shunt regulator coupled between the output terminal and the first node.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
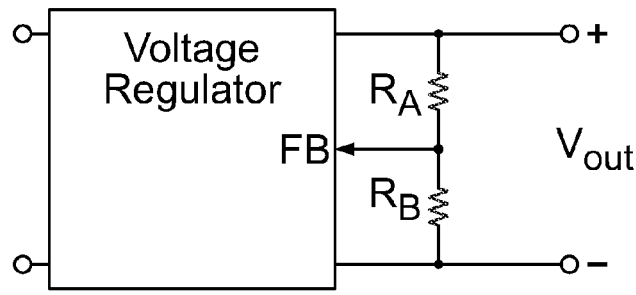
FIG. 1 is a block diagram of a DC voltage regulator circuit according to the prior art.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
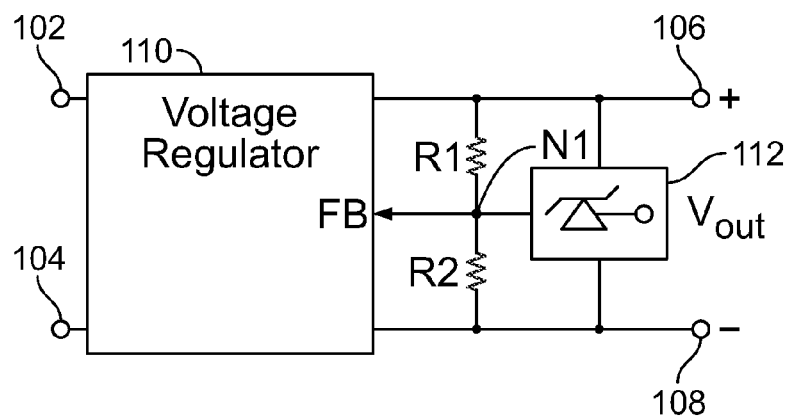
FIG. 2 is a block diagram of a power supply including a DC voltage regulator according to one example embodiment of the present disclosure.

A power supply according to one example embodiment of the present disclosure is illustrated in FIG. 2 and indicated generally by reference number 200. As shown in FIG. 2, the power supply 200 includes a pair of input terminals 102, 104, a pair of output terminals 106, 108, and a DC voltage regulator 110 coupled between the input terminals and the output terminals for providing a constant DC output voltage Vout at the output terminals 106, 108. The power supply 200 further includes a voltage divider and an adjustable shunt regulator 112. The voltage divider is formed by resistors R1, R2 coupled between the output terminals 106, 108. A node N1 between the resistors R1, R2 is coupled to a feedback (FB) input of the DC voltage regulator 110 for providing a feedback voltage indicative of the output voltage Vout. The DC voltage regulator 110 uses the feedback voltage to regulate the DC output voltage Vout. The adjustable shunt regulator 112 is coupled between the output terminals 106, 108 and the node N1.

As will be apparent to those skilled in the art, the adjustable shunt regulator 112 may be coupled between the output terminals 106, 108 and the node N1 in various ways using resistors, capacitors and/or transistors (not shown in FIG. 2).

The adjustable shunt regulator 112 preferably has a tight voltage tolerance that can be used to improve (i.e., reduce) the tolerance associated with the typical feedback voltage provided by a voltage divider. For example, in one particular implementation, the addition of the adjustable shunt regulator 112 to the power supply 200 reduced the tolerance of the feedback voltage from ±2.5% to ±1.0%. This, in turn, reduced the tolerance of the rated output voltage, rendering the power supply 200 suitable for applications demanding tightly regulated DC voltages.

As apparent to those skilled in the art, the input terminal 104 and the output terminal 108 may be reference terminals, also referred to as ground terminals, and may be coupled to earth ground.

Figure 3:
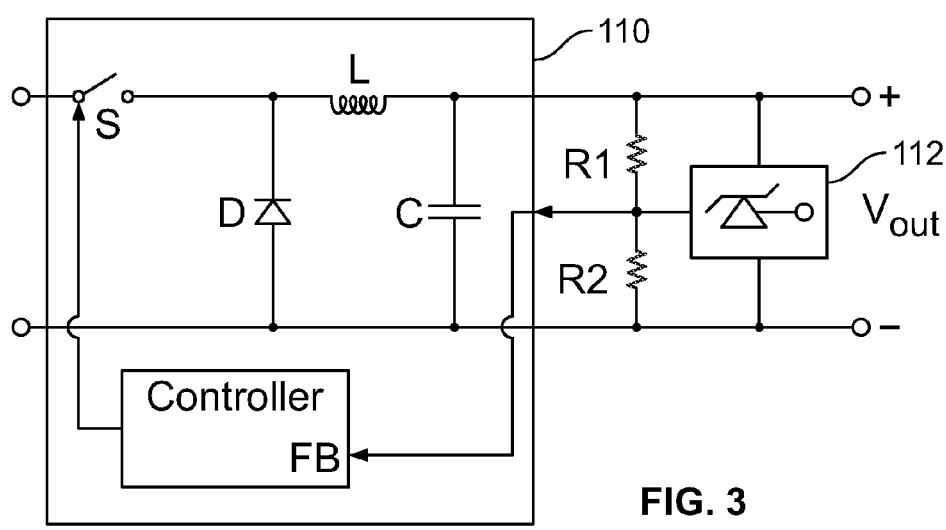
FIG. 3 is a block diagram of the power supply of FIG. 2 where the DC voltage regulator includes a non-isolated buck converter.
Figure 4:
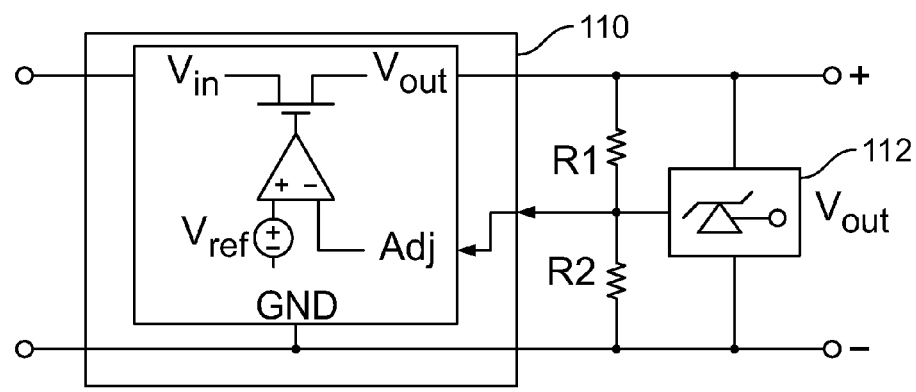
FIG. 4 is a block diagram of the power supply of FIG. 2 where the DC voltage regulator includes a linear regulator.

The DC voltage regulator 110 may be a linear regulator, a switching regulator employing any suitable topology (e.g., a buck or boost topology), etc. FIG. 3 illustrates one example embodiment in which the voltage regulator 110 includes a non-isolated buck converter. As shown in FIG. 3, the buck converter may include an inductor L, a diode D, a capacitor C, at least one power switch S, and a controller configured to control the power switch(es) S. FIG. 4 illustrates another example embodiment in which the voltage regulator 110 includes a linear regulator.

Figure 5:
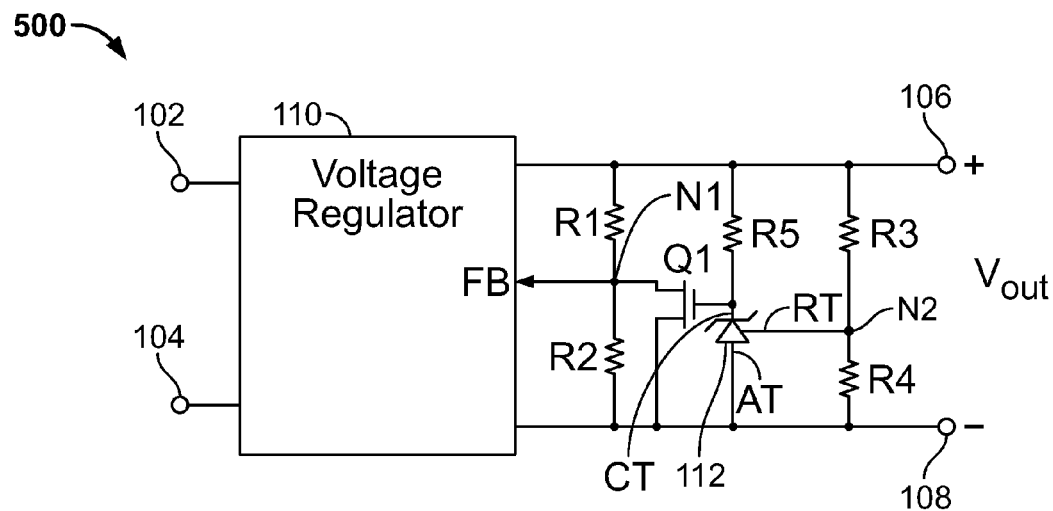
FIG. 5 is a circuit schematic illustrating one example circuit configuration for the power supply of FIG. 2.

FIG. 5 illustrates a power supply 500 including a voltage regulator 110 and an adjustable shunt regulator 112 according to another example embodiment. In this example, the adjustable shunt regulator 112 includes an anode terminal AT, a cathode terminal CT, a reference terminal RT, and an internal reference voltage, such as 2.5V. The cathode terminal CT is coupled to the output terminal 106 through a resistor R5. The cathode terminal CT is also coupled to the node N1 via a transistor Q1. In the example shown in FIG. 5, the transistor Q1 is a field effect transistor (FET) having a gate terminal, a source terminal and a drain terminal. Alternatively, a bipolar transistor can be employed. The anode terminal AT of the adjustable shunt regulator 112 is coupled to ground. In addition to the voltage divider formed by resistors R1, R2, the example power supply of FIG. 5 includes another voltage divider formed by resistors R3, R4. A node N2 between the resistors R3, R4 is coupled to the reference terminal RT of the adjustable shunt regulator 112.

The adjustable shunt regulator 112 is configured to sink current through its cathode terminal CT as necessary to maintain its reference terminal RT at a voltage equal to the internal reference voltage. Therefore, the values of the resistors R3, R4 are selected to provide a voltage at the node N2 equal to the internal reference voltage of the adjustable shunt regulator 112 when the output voltage Vout is equal to the rated output voltage.

In one particular implementation, the power supply of FIG. 5 is configured to produce a rated output voltage of 5V from a 12VDC input voltage, and the internal reference voltage of the adjustable shunt regulator 112 is 2.5V. Therefore, the resistors R3, R4 preferably have the same resistance value so the voltage at the node N2 will be 2.5V when the output voltage Vout is 5V. Additionally, the resistor divider formed by resistors R1, R2 may be configured to provide a feedback voltage of 0.8V to the feedback (FB) input of the voltage regulator 110 when the output voltage Vout is 5V. However, the actual value of the feedback voltage may initially be greater or less than 0.8V when the DC output voltage is 5V due to component tolerances, line and load regulation variances, etc.

If the actual value of the feedback voltage is greater than 0.8V when the output voltage Vout is 5V, the power supply will assume the output voltage Vout is greater than 5V and adjust its operation as necessary to decrease the output voltage Vout. As a result, the output voltage Vout may drop below 5V, causing the voltage at the node N2 to drop below 2.5V. In response, the adjustable shunt regulator 112 will sink current through resistor R5 and its cathode terminal CT as necessary to increase the voltage at the reference terminal RT to 2.5V. This, in turn, will adjust the voltage at the control terminal (e.g., the gate) of the transistor Q1, which will adjust the current flowing through transistor Q1 to decrease the voltage at the node N1 until the output voltage Vout returns to 5V.

Preferably, the power supply of FIG. 5 is configured to produce its rated output voltage (e.g., 5V) when the voltage at the FB input has its lowest possible value. For example, if the expected feedback voltage is 0.8V±2.5%, the power supply may be configured to produce its rated output voltage when the voltage at the FB input is 0.78V (i.e., 0.8V−2.5%). Therefore, when the actual feedback voltage is 0.78V, the power supply will produce its rated output voltage with the adjustable shunt regulator sinking no current. As the actual feedback voltage increases from its minimum of 0.78V to its maximum of 0.82V, the adjustable shunt regulator can sink an increasing amount of current as necessary to maintain the output voltage Vout at its rated value.

Figure 6:
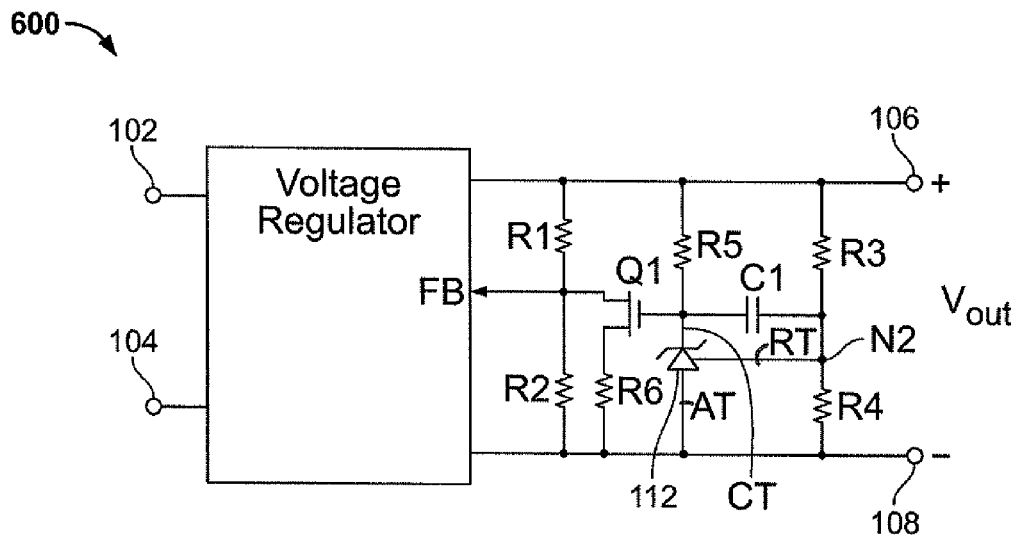
FIG. 6 is a circuit schematic illustrating another example circuit configuration for the power supply of FIG. 2.

FIG. 6 illustrates a power supply 600 according to another example embodiment. The power supply of FIG. 6 is similar to the power supply 500 of FIG. 5, except the power supply of FIG. 6 includes a capacitor C1 coupled between the cathode terminal CT and the reference terminal RT of the adjustable shunt regulator 112. The capacitor C1 controls the loop response of the adjustable shunt regulator 112. It can be a single capacitor as shown or a network of capacitors and resistors to modify the frequency response of the adjustable shunt regulator 112 as desired. In the example of FIG. 6, the capacitor C1 is sized to provide a slow loop response. The voltage regulator uses the resistors R1 and R2 for the fast frequency response built into its controller. The adjustable shunt regulator modifies the DC gain of the voltage regulator without interfering with the frequency response of the voltage regulator's controller. If the capacitor C1 is not present (e.g., as in the example of FIG. 5), the response of the adjustable shunt regulator may be very fast.

Additionally, the power supply of FIG. 6 includes a resistor R6 coupled between the transistor Q1 and ground. In the example of FIG. 6, where the transistor Q1 is a FET, the resistor R6 is coupled between the source terminal of the FET and ground. The resistor R6 can limit the adjustment range of the adjustable shunt regulator. The two extremes are the minimum voltage and the maximum voltage present on the cathode terminal of the adjustable shunt regulator. In these cases, transistor Q1 will be off or fully on. When Q1 is off, the feedback voltage is determined by the resistor divider network of R1 and R2. When Q1 is fully on, the feedback voltage is determined by the resistor divider network of R1 and R2|R6. If R6 is zero ohms and capacitor C1 is not present (e.g., as in the example of FIG. 5), the adjustable shunt regulator will act as a high gain hysteretic control.

While FIGS. 5 and 6 illustrate two specific circuit configurations, it should be understood that the adjustable shunt regulator 112 may be coupled between the output terminals 106, 108 and the node N1 in any suitable manner without departing from the scope of these teachings.

The adjustable shunt regulator 112 may be, for example, a TL431 type device, which is a low power consumption device having a 2.5V internal reference voltage with a tolerance of ±0.5%. As a result, using 1% resistors, the 5V output voltage at node 106 can be controlled to about ±1.5%. This tolerance can be further reduced by using an adjustable shunt regulator 112 and/or resistors R3, R4 with tighter tolerances (e.g., precision resistors, precision resistor dividers, laser trimmed resistors, etc.). The actual tolerance achieved will be a function of the ratio of the resistances of R3 and R4.

Figure 7:
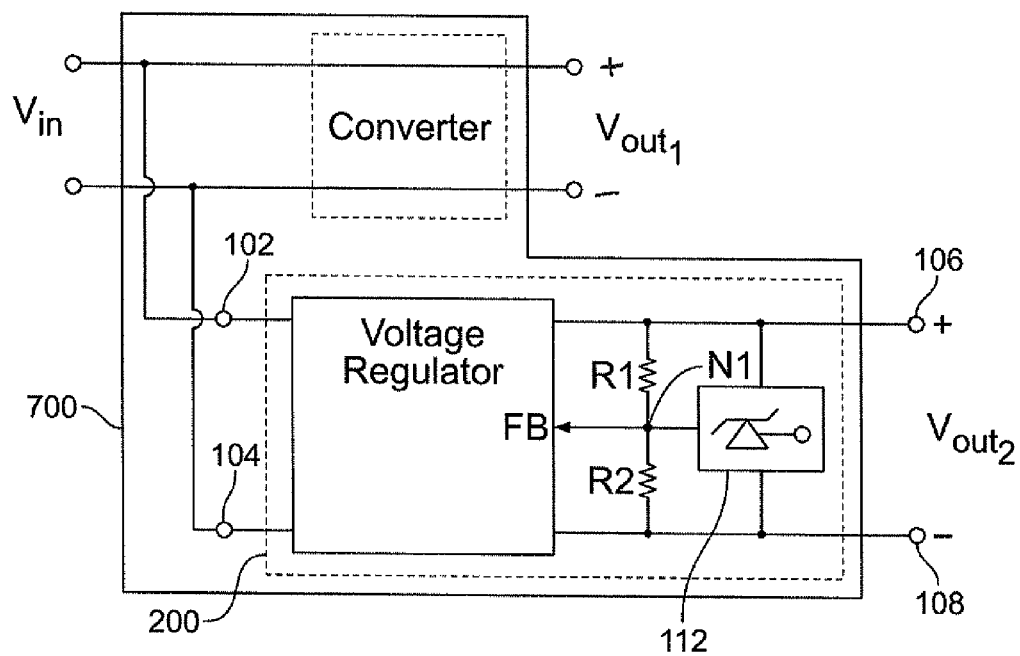
FIG. 7 is a block diagram of a power supply incorporating the power supply of FIG. 2.

The power supplies disclosed herein may be used in a wide variety of applications. For example, and as shown in FIG. 7, the power supply 200 of FIG. 2 may be incorporated into a larger power supply 700 configured to provide two or more DC output voltages Vout1, Vout2. The DC output voltages Vout1, Vout2 may be 12V and 5V, respectively, or any other desired voltages.

Figure 8A:
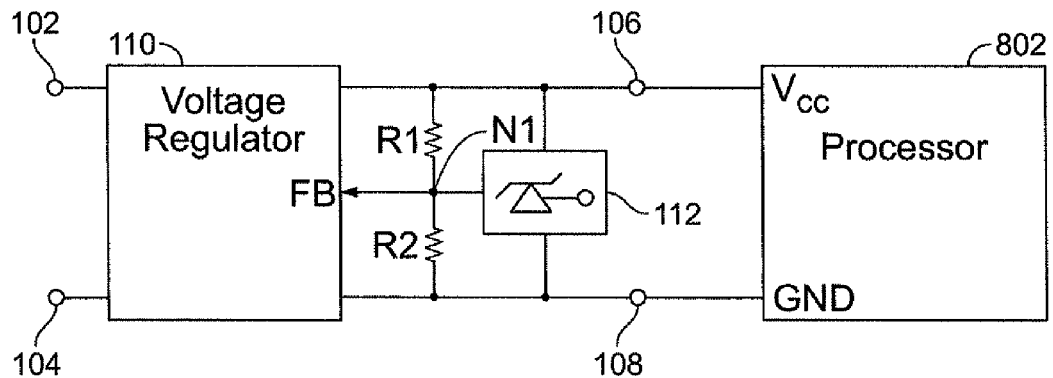
FIGS. 8A-8C are block diagrams illustrating the power supply of FIG. 2 coupled to voltage supply and/or reference voltage inputs of a processor.
Figure 8B:
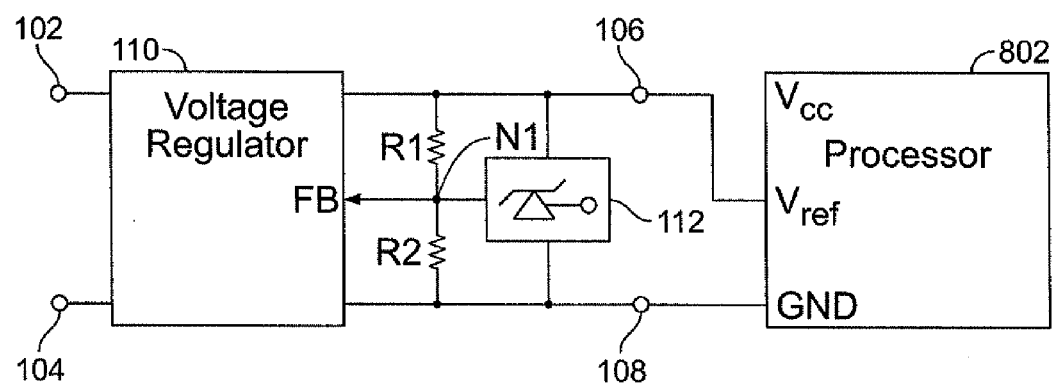
Figure 8C:
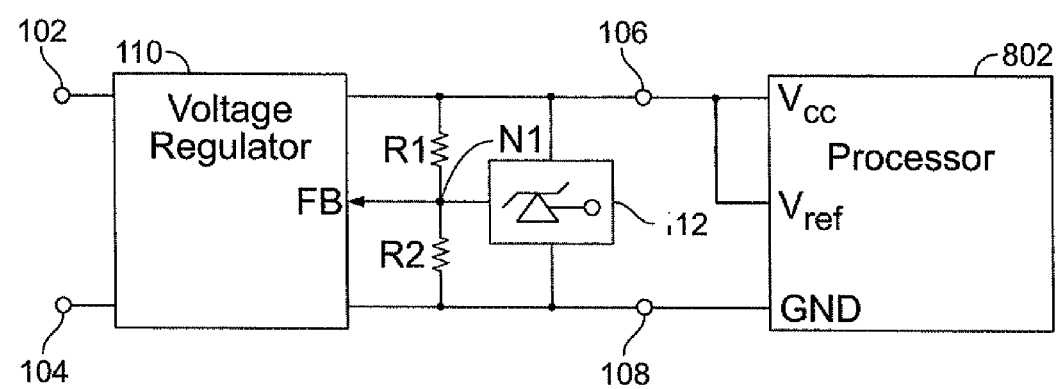

The power supply 200 of FIG. 2 may also be used to provide a constant DC output voltage to the supply voltage input of a processor 802 as shown in FIG. 8A, or to a voltage reference input of the processor 802 as shown in FIG. 8B, or to a supply voltage input and a voltage reference input of the processor 802 as shown in FIG. 8C. The processor 802 may be a microprocessor, microcontroller, digital signal processor (DSP), etc. Further, the processor 802 may be a digital controller for a power supply (such as a power supply incorporating the power supply 200 of FIG. 2). In that event, the digital controller may use the voltage provided to its reference voltage input for controlling the main output of the supply and/or for monitoring or other supervisory circuits.

It should be understood that the specific values mentioned herein (e.g., 5V, 2.5V, 0.8V, plus/minus 0.5, 1 2.5 percent, etc.) are merely examples, and that other values may be used in any given implementation of these teachings. It should also be understood that the tolerance of the adjustable shunt regulator and other components (including the resistors) can be chosen as necessary to achieve the tolerances desired for a particular implementation.

As should be apparent, the teachings of this disclosure can be used to achieve tight DC voltage tolerances without requiring potentiometer trimming, test selecting resistor values, or implementing calibration routines for processor(s) or other components (although one or more of these techniques can also be employed, if desired).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power supply comprising:
    an input terminal;
    an output terminal;
    a DC voltage regulator coupled between the input terminal and the output terminal to provide a substantially constant DC output voltage at the output terminal;
    a voltage divider coupled between the output terminal and ground, the voltage divider including at least a first resistance, a second resistance and a first node between the first resistance and the second resistance, the first node coupled to the DC voltage regulator to provide a feedback voltage to the DC voltage regulator for regulating the DC output voltage; and
    an adjustable shunt regulator coupled between the output terminal and the first node.

2. The power supply of claim 1 further comprising a digital controller having a supply voltage input, wherein the output terminal is coupled to the digital controller's supply voltage input.

3. The power supply of claim 2 wherein the digital controller includes a reference voltage input, and the output terminal is coupled to the digital controller's reference voltage input.

4. The power supply of claim 1 wherein the output terminal and the DC output voltage are a first output terminal and a first DC output voltage, respectively, the power supply further comprising a second output terminal to provide a second DC output voltage different than the first DC output voltage.

5. The power supply of claim 1 wherein said voltage divider is a first voltage divider, the power supply further comprising a second voltage divider coupled between the output terminal and ground, the second voltage divider including at least a third resistance, a fourth resistance and a second node between the third resistance and the fourth resistance, the adjustable shunt regulator including a reference terminal coupled to the second node.

6. The power supply of claim 5 wherein the adjustable shunt regulator includes a cathode terminal, the power supply further comprising a transistor coupled between the cathode terminal of the adjustable shunt regulator and the first node.

7. The power supply of claim 6 wherein the transistor is a field-effect transistor (FET).

8. The power supply of claim 7 wherein the cathode terminal of the adjustable shunt regulator is coupled to the output terminal through a resistance.

9. The power supply of claim 8 wherein the adjustable shunt regulator includes an anode terminal coupled to ground.

10. The power supply of claim 1 wherein the DC voltage regulator comprises a switching regulator.

11. The power supply of claim 10 wherein the switching regulator comprises a buck converter.

12. The power supply of claim 11 wherein the buck converter is a non-isolated buck converter.

13. The power supply of claim 1 wherein the DC voltage regulator comprises a linear regulator.

14. The power supply of claim 1 wherein the DC output voltage has a rated tolerance less than or equal to about one percent (1%).

* * * * *